United States Patent
Thummalapalli et al.

(10) Patent No.: US 11,228,648 B2
(45) Date of Patent: *Jan. 18, 2022

(54) INTERNET OF THINGS (IOT) PLATFORM FOR DEVICE CONFIGURATION MANAGEMENT AND SUPPORT

(71) Applicant: ServiceNow, Inc., Santa Clara, CA (US)

(72) Inventors: Swaroop Gnana Thummalapalli, Hyderabad (IN); Aditya Ramamurthy, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,982

(22) Filed: Jul. 27, 2020

(65) Prior Publication Data
US 2020/0358853 A1 Nov. 12, 2020

Related U.S. Application Data

(63) Continuation of application No. 15/939,712, filed on Mar. 29, 2018, now Pat. No. 10,728,340.

(51) Int. Cl.
*H04L 29/08* (2006.01)
*H04L 12/24* (2006.01)
*G06F 16/951* (2019.01)

(52) U.S. Cl.
CPC .............. *H04L 67/12* (2013.01); *H04L 41/20* (2013.01); *H04L 67/10* (2013.01); *H04L 67/141* (2013.01); *G06F 16/951* (2019.01)

(58) Field of Classification Search
USPC ......................................................... 709/217
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |

(Continued)

FOREIGN PATENT DOCUMENTS

WO 2016118979 A2 7/2016

*Primary Examiner* — Hermon Asres
(74) *Attorney, Agent, or Firm* — Fletcher Yoder PC

(57) ABSTRACT

Techniques for management of Internet of Things (IOT) devices are disclosed. IOT devices may be manufactured with a pre-installed software development kit (SDK) (e.g., in firmware or other storage). At initial startup time (e.g., after device placement), IOT devices may execute the firmware code as provided by the SDK to connect to a corporate network or other network-based control environment, such as a cloud-based service provider infrastructure. Once connected, IOT devices may participate in enterprise computing applications as a consumer or provider of information. Updates to IOT devices and their SDKs may be periodically provided. Virtual IOT devices may be used as placeholders or emulators for unavailable or future IOT devices, such that enterprise applications may be configured and executed without an actual physical IOT device in existence. Virtual IOT devices may also be used to assist with overall device provisioning.

20 Claims, 6 Drawing Sheets

(56) References Cited

U.S. PATENT DOCUMENTS

| | | |
|---|---|---|
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Meuller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,534,903 B2 | 4/2017 | Cline |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 2016/0041534 A1* | 2/2016 | Gupta ................ H04L 12/2816 700/275 |
| 2016/0065653 A1* | 3/2016 | Chen ...................... H04L 67/34 715/735 |
| 2016/0364223 A1* | 12/2016 | Vandikas ................ H04L 67/34 |
| 2017/0187807 A1* | 6/2017 | Clernon ............. H04L 41/0806 |

\* cited by examiner

INTERNET OF THINGS (IOT) PLATFORM FOR DEVICE CONFIGURATION MANAGEMENT AND SUPPORT

This application is a continuation application of U.S. patent application Ser. No. 15/939,712, filed Mar. 29, 2018, of which is hereby incorporated by reference in its entirety for all purposes.

TECHNICAL FIELD

Embodiments described herein generally relate to cloud computing and, in particular, to managing Internet of Things (IOT) devices as part of a comprehensive service management infrastructure for an enterprise or organization. In one example, IOT devices may be integrated into work flows relating to incident reporting and corresponding service level agreements (SLAs), e.g., as supported by a cloud-based service provider used by the enterprise.

BACKGROUND

Cloud computing involves sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources located at remote locations in an "on demand" fashion in order to perform a variety computing functions that include storing and/or processing computing data. For enterprise and other organizational users, cloud computing provides flexibility in accessing cloud computing resources without accruing excessive up-front costs, such as purchasing network equipment and/or investing time in establishing a private network infrastructure. Instead, by utilizing cloud computing resources, users are able redirect their resources to focus on core enterprise functions.

In today's communication networks, examples of cloud computing services that a user may utilize include software as a service (SaaS) and platform as a service (PaaS) technologies. SaaS is a delivery model that provides software as a service, rather than as an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud-based developmental platform for users to develop, modify, manage and/or customize applications and/or automate enterprise operations—without maintaining network infrastructure and/or allocating computing resources normally associated with these functions.

The so-called "Internet of Things" (IOT) is growing rapidly. The amount of data available from IOT devices is also increasing rapidly, and there are no standard mechanisms in place to interface with the growing number of devices that are being made "smart" or "Internet ready." Broadband Internet is omnipresent for today's enterprise organizations, and the use of network-enabled devices with sensors and control options are ever increasing. For example, historically simple devices such as a thermostat, video recorder, fan control, or security system are now commonly connected to the Internet. In turn, some of these devices have communication and control capabilities. These capabilities are typically accessed using applications that may execute on a laptop computer or phone, which have been specifically written to interface with such devices. These applications are typically custom built for a particular IOT device and allow specific functionality tailored to the capabilities of the specific IOT device for which the application was designed. Although these applications allow end users some control, they do not scale very well for an enterprise environment that may have hundreds of IOT devices across the enterprise. Further, existing devices do not provide any mechanism for integrating their communication applications (or their raw inputs and outputs) into a large scale application environment.

In general, current IOT solutions are not integrated into existing workflows of a company and cannot be utilized effectively to derive decisions. For example, some IOT devices may send a large set of sensor data, only a subset of which can be used or actioned. Some IOT devices can understand actions but are not very programmable, so they require remote control of these actions. IOT devices may also run fragmented versions of software because of their inability to receive software updates "over the air." IOT devices are often in physically unreachable (or difficult to reach) places but are connected to the network. This makes it difficult to physically update them, even though they continue to send/receive data. IOT devices communicate through a wide range of protocols (e.g., Hypertext Transport Protocol (HTTP), User Datagram Protocol (UDP), Message Queuing Telemetry Transport (MQTT), sockets, etc.) and there is presently no standard way to communicate with a server platform or other IOT devices.

This disclosure addresses these and other issues, in part by providing a standardized interface to IOT devices that may be integrated into the IOT devices at time of manufacture, such that it is available for use and may assist with initial startup and configuration of the IOT device once it has come online (e.g., been placed into service). This standardized interface may also allow for integration of IOT devices into enterprise-level applications, such as those made available from cloud-based service providers. Virtual IOT devices are also disclosed to facilitate communication with future or temporarily unavailable real world devices.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In a first example, an apparatus configured as an internet of things (IOT) endpoint device is disclosed. The IOT endpoint device may include a memory storage area storing computer instructions including a software development kit (SDK), the SDK provided, at least in part, by an enterprise system service provider; and a network interface communicatively coupled to one or more processing units and the memory storage area. The one or more processing units execute the instructions to cause the apparatus to: establish an automatic connection to a cloud-based management server customer instance, the automatic connection established using the network interface and a first connection to a private network, a second connection from the private network to a public network, and a third connection from the public network to the cloud-based management server customer instance; transmit information regarding control and command capability of the IOT endpoint device using a communication mechanism facilitated by the SDK to the cloud-based management server customer instance, the transmitted information comprising a set of actions applicable to the IOT endpoint device, wherein at least one action from the set of actions is previously not known at the cloud-based management server customer instance; receive and respond to requests for information from the cloud-based management server customer instance to provide information sufficient to integrate the apparatus into a workflow defined on the customer instance and supported by the cloud-based management server maintained by the enterprise system service provider; and receive a command request initiated by the cloud-based management server customer instance to initiate at least one of the set of actions.

In a second example, a system is disclosed that includes one or more servers remote from an enterprise client network of computer systems and endpoint devices, the client network communicatively coupled to the one or more servers via a public network; and an enterprise management platform operable across the one or more servers. The enterprise management platform is configured to perform operations comprising: hosting one or more client instances configured to manage the enterprise client network and one or more individual devices on the enterprise client network; configuring each of a plurality of IOT endpoint devices with an SDK, such that the plurality of IOT endpoint devices are configured to be monitored by the one or more client instances; detecting that a first physical IOT device of the plurality of IOT endpoint devices is unavailable to perform one or more functions, wherein the first physical IOT device is detected as unavailable, at least in part, by lack of communication with the SDK installed on the first physical IOT device; and causing a virtual IOT device at the one or more client instances to act as a proxy for the first physical IOT device to perform the one or more functions, based at least in part on the unavailability of the first physical IOT device to perform the one or more functions.

In a third example, a cloud-based computer system that includes a memory partition; and a network interface communicatively coupled to one or more processing units and the memory partition. The memory partition may include computer instructions that when executed by the one or more processing units cause the cloud-based computer system to: maintain a virtual internet of things (IOT) device, wherein the virtual IOT device represents a physical IOT device or a future IOT device; detect that a first physical IOT device is not available for a period of time; impersonate the first physical IOT device, using the virtual IOT device, for instances where the virtual IOT device represents the first physical IOT device and for the period of time the first physical IOT device is not available; and impersonate the future IOT device, using the virtual IOT device to create an emulated future IOT device, for instances where the virtual IOT device represents the future IOT device until a second physical IOT device is installed to replace the emulated future IOT device.

BRIEF DESCRIPTION OF DRAWINGS

For a more complete understanding of this disclosure, reference is now made to the following brief description, taken in connection with the accompanying drawings and detailed description, wherein like reference numerals represent like parts. Different instances of the same part may be referred to with a single quote (i.e., "prime") such that elements 5' and 5" represent the same fundamental thing but a different instance of element 5.

DESCRIPTION OF EMBODIMENTS

Figure 1:
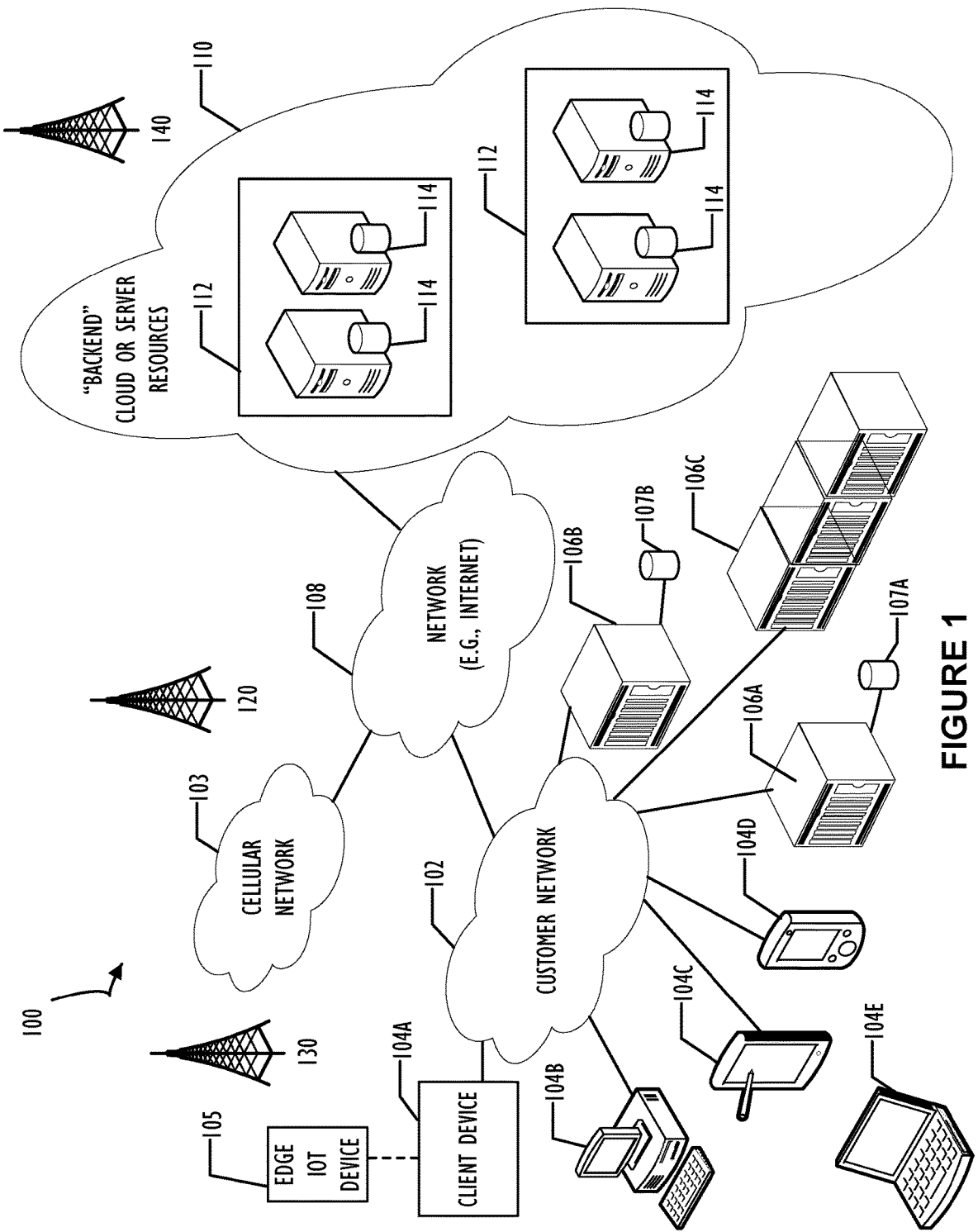
FIG. 1 illustrates a block diagram of an embodiment of a network infrastructure 100 that includes a cloud computing system and customer network (e.g., private network) where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

An integration to an enterprise system to support task flows (e.g., automated work flows of an organization) may be referred to herein as an "integration hub" and may be configured to support a multitude of external systems, including IOT devices, and their connection to a cloud-based enterprise system. Often times, these external systems may be behind customer firewalls and may require use of an internal server (e.g., a management, instrumentation, and discovery (MID) server on the customer private network) to complete the integration. In a typical customer setup, there may be multiple MID servers with access to different systems.

This disclosure addresses problems associated with inconsistencies of IOT devices, in part, by providing a standardized interface platform (e.g., using a software development kit (SDK)) that may be used by device manufacturers to provide a default capability for their device to practice disclosed embodiments. Other problems associated with IOT devices are also addressed. In particular, problems associated with integrating IOT devices into enterprise-level software applications such as cloud-based help desk applications, and/or service level management applications. Because IOT devices are not necessarily always available via the Internet, this disclosure also addresses a need to provide a "valid" response for an IOT device query (e.g., asking the IOT device for information), even when the IOT device is "offline." The IOT device may be "offline" for a variety of reasons, including but not limited to, network communication issues, maintenance (either upgrade or repair), or other reasons. A standard application program interface (API) to communicate via a handshake and discover the communication protocol may simplify the connection strategy between the different systems. Data captured from the IOT devices and actionable intelligence may be better visualized and integrated with other enterprise data by using an analytical dashboard. Security of communication with IOT devices is also addressed. Solutions to each of the above mentioned problems represent an improvement to the technology area of computer applications and network based control of devices, specifically IOT devices. Further, the performance capabilities and functionality of IOT devices may also be enhanced.

Techniques for management of IOT devices are disclosed. IOT devices may be manufactured with an integrated default SDK (e.g., in firmware or other storage). At initial startup time (i.e., after device installation) IOT devices may execute the firmware code as provided by the SDK to connect to a corporate network or other network-based control environment, such as a cloud-based service provider infrastructure. Once connected, IOT devices may participate in enterprise computing applications as a consumer or provider of information. Updates to IOT devices and their SDK may be periodically provided. Virtual IOT devices may be used as placeholders or emulators for unavailable or future IOT devices, such that enterprise applications may be configured and executed without an actual physical IOT device. Virtual IOT devices may act as a proxy for future or unavailable devices and may assist with overall device provisioning.

This disclosure addresses related issues on both the IOT device side and the server side of the aforementioned communication, upgrade, and control problem. In the following examples, the IOT device is considered a client, and the control side that talks to the IOT device is considered the server. The client side may also be referred to herein as the "IOT device side," or simply "IOT side," and the server side may be implemented in a "client instance" of a cloud-based computer system (e.g., an "IOT Cloud"), or may be implemented on traditional server side hardware. In one embodiment, the IOT side contains an OS firmware that is coded to work in a coordinated manner with a cloud service provider SDK. This OS firmware may be baked into the hardware EPROM by the hardware manufacturer. That is, the manufactured device may have its own proprietary control software in addition to an SDK provided by a third party software application provider (e.g., the cloud service provider).

IOT Device Side Software Development Kit (SDK)

The IOT side SDK may have a communication and configuration layer to assist the IOT device to perform the following tasks (see, for example, element 586 in FIG. 5):

Connect the IOT device to a cloud service provider IOT proxy (from where it may be approved).
  Hardware manufacturers may add the cloud service provider SDK, and implement "IOT Actions" as a part of the firmware/software for the IOT device.
  IOT devices may utilize functionality of the SDK to connect to a cloud service provider IOT Gateway when they are installed and initially booted up and await approval.
  Once approved (automatic/manual), the IOT devices may be "provisioned" into the system (e.g., integrated into enterprise level applications as a new "configuration item" (CI), and may be monitored/controlled remotely.
Broadcast a list of IOT actions to an associated customer instance provided by the cloud service provider for a customer determined to be associated with the IOT device. These actions may then be remotely triggered from any cloud service provider applications (e.g., service level management, Configuration Management Database (CMDB), help desk, task flow job scheduling system, etc.).
Provide a communication layer with cloud service provider to post/receive data to/from the IOT Cloud.
  IOT devices may continue to communicate with cloud service provider IOT device Proxy (e.g., Virtual IOT device) and can send data via HTTP(s), Message Queuing Telemetry Transport (MQTT), or other protocols as configured by the handshake.

IOT devices may be configured to post data into one or more of the cloud service provider databases (e.g., CMDB or a time series database such as an event log).

SDK-equipped IOT devices may also be configured to pull information from the cloud service provider CMDB.

Other cloud service provider applications may be configured to recognize and then utilize the broadcasted 'IOT actions' to trigger actions remotely for a specific IOT device. In this manner, the infrastructure is adaptable to newly-introduced IOT devices and capabilities as they appear in actual use by an enterprise.

The client side SDK may also have an application layer that is above the OS/Firmware layer to assist with application development for IOT devices, e.g., assisting with the following tasks (see, for example, element 584 in FIG. 5):

IOT Application Layer

IOT Applications may be developed on the top (from a logical layering perspective) of the OS Firmware with the IOT device SDK.

The SDK may have features to automatically detect and report any application layer code updates.

Over the air update of IOT applications may be supported. The updates may be provided and applied in a manner to ensure the entire update is properly applied if the update contains multiple segments so that the IOT device does not get corrupted.

When the OTA update takes place, the IOT system may temporarily enter a maintenance mode and turn off the sensors/equipment safely (which may, e.g., be implemented by a shutdown method). Post-upgrade the sensors may be re-initialized and turned back on (specific actions may be written in a boot method). For example, if a device has water turned on it may (or may not) be desirable to leave the water on for the duration of the update. Depending on the device, water should be left in its current state, or the OTA update should be postponed to a more appropriate time (e.g., maintenance window).

IOT Application layer may be written in different programming languages depending on the capabilities of an IOT device. The implementation of the IOT Application layer may affect how an update is performed.

When the IOT Application layer is implemented using low level languages like C/C++, a new firmware binary may be OTA updated. In this example, the firmware may be re-flashed and the IOT device rebooted to make the new version active.

When the IOT Application layer is implemented using Higher level languages, e.g., JavaScript, the underlying firmware may be left "as-is" without requiring firmware re-flashing. Accordingly, it may be possible to download and evaluate the IOT Applications over the air without any firmware re-flashing (and possibly no reboot of the IOT device).

In some embodiments, IOT Application version may be tracked by the server through a device management dashboard in a manner consistent with how the enterprise tracks configuration management details for non-IOT devices.

IOT Server Side (IOT Cloud)

The server side IOT cloud may also have an application layer to facilitate communication and configuration of client side IOT devices, including performance of the following tasks (see, for example, element 517 in FIG. 5):

Authentication/Device Registration

A cloud service provider IOT device "proxy" may be configured to accept connection requests from all IOT devices and route those connect requests as appropriate.

Through a batch/manual process, an infrastructure administrator may approve these devices so that they can each be issued a unique device authentication token.

An IOT device authentication token may be used by an IOT device for all further requests to the server.

The authentication token may be invalidated to force the device to be re-configured and re-approved into the system. For example, if the IOT device is out for repair such that the device does not send false/diagnostic data.

Device Monitoring/Management

Activated IOT devices may be controlled by a dashboard that may be configured to show the capabilities and the last action/timestamp at which the IOT device was last communicated with.

Automated alerts may be set so that IOT devices that are not reporting heart-beat messages may be reset and re-configured to be connected to the IOT Cloud.

Dashboards that can enable live monitoring of the IOT device, and their current state may help the device administrators have a holistic view of all the devices.

Some IOT devices may also be configured to send live location data. In this case, the visualization could be configured to show the last known location on a geographical map.

Location dashboard could provide a live bird's eye view of all the IOT device that are located at different geographic locations.

Indoor IOT devices may also be mapped into a floor map to be displayed to the device administrators through a dashboard.

IOT Applications and their versions can be remotely monitored from a dashboard and if there's an anomaly in the data being reported can be turned off, deactivated, or reset via a dashboard.

If there is an upgrade available for the IOT Application software of a particular IOT device, this update may be delivered to the IOT device via an over the air update.

Virtual IOT Device

In some instances, when the server side attempts to interact with an IOT device to trigger IOT Actions, that device may not be online or responsive.

For example, the following pseudocode shows an example of an IOT device that may interact with a temperature control device such as a thermostat.

```
IOTDevice device = new IOTDevice("TEMP_SENSOR_111");
var currentTemperature = device.readTemperature( );
If(currentTemperature > MAX_THRESHOLD) {
// DO SOMETHING about temperature
}
```

In this case, the currentTemperature may be returned by a virtual IOT device impersonating the real world device (RWD). The virtual IOT device, may be configured to return the most recently read temperature that is acceptable (based on the time lapsed after the last temperature report) rather than report an error (e.g., communication error).

Trigger Action for the IOT device may also be driven through the IOT Entity/Virtual Device and should not affect the calling program (e.g., Integration Hub application, or other server side IOT Application)
For example, the following pseudocode shows an example of an IOT device that may interact with a fan control device such as an exhaust fan.
   IOTDevice device=new IOTDevice("FAN001");
   device.toggleFAN("ON");
In this example, if there is a temporary communication failure, this action to toggleFAN will not wait for the device to receive the message, but will be queued through the virtual IOT device and processed on the RWD when the RWD is available to "handle" this action.
In certain embodiments, this messaging may be implemented using a database-driven queue. The delivery/processed state may be captured, so that messages or actions for multiple IOT devices are persisted when the receiving IOT device is offline temporarily.
Using a server-side platform's workflow (e.g., an Integration Hub application), when IOT actions are not delivered to their respective IOT devices for a preconfigured period of time, an automated alert/incident may be generated, for example, to request a manual inspection of the IOT device.
Communication Layer—IOT Cloud
IOT device to IOT Cloud communication (e.g., client to server communication)
   The disclosed IOT device SDK may be configured to provide an application program interface (API) to allow the IOT device to send/receive HTTP(s) or MQTT communication requests with the IOT Cloud.
   The IOT Cloud may be implemented using REST APIs configured to validate the input and reject any invalid data communications. These REST APIs may be coded by the hardware vendors, possibly with the support of Business Rules or Script Includes provided by the server side cloud service provider (e.g., pre-built integrations).
IOT device to IOT Cloud communication (e.g., server to client communication)
   Any outgoing requests from the IOT cloud to the IOT device may happen on-demand and may be triggered using device IOT Actions (e.g., actions that were previously communicated by the IOT device as part of registration as discussed above).
   Integration hub type applications may be configured to trigger an action through an IOT device SDK on a particular IOT device (or group of IOT devices), as required from the server side perspective.
      For example, the following pseudocode may be used to turn a fan from on to off or off to on at a specific location in the enterprise:
         IOTDevice device=new IOTDevice('<unique id>');
         device.performAction('toggle-fan');
         or
         var queryCriteria={'capability': 'toggle-fan', 'location': 'DataCenter1'};
         IOTDeviceGroup
         devices=IOTDeviceUtility.query(queryCriteria);
         devices.performAction('toggle-fan', ON);
Integration Hub
   Workflows may be defined against an IOT Entity or the Data Entity that the IOT device can capture. Workflows may also be configured to auto trigger creation of Incidents, alerts etc.

When using the disclosed SDK, certain provisions for Offline handling of an IOT device may be taken into consideration by the enterprise for both the server side (IOT cloud) and at the client side (IOT device). For example, messages from an IOT device to a server and server to an IOT device may be sent via the above mentioned SDK communication layer. When an IOT device is offline, a communication layer of the SDK may attempt to reconnect back to a preconfigured WiFi Router and may continue to try alternate paths in an attempt to synchronize data across to the server side. Messages sent from the IOT device to the server may be written in an IOT device side file system so that they are not lost when the IOT device is momentarily offline. The IOT device may then "transparently" sync back to the server once the IOT device has re-established a communication connection (e.g., back online). Actions triggered by the server side for each IOT device may be stored in an IOT message table and these messages may be pulled down (or resent after the IOT device is back online) by the IOT device and actioned as necessary on the IOT device once provided by the IOT device communication layer. These actions may then be marked as complete on both the client side and server side through an acknowledgement loop once the action has been addressed at the IOT device.
Performance Analysis and Dashboards
   A performance analysis dashboard may be configured to drill down to into data from any IOT devices that may have aggregated data over time at the server (e.g., to examine data at a finer granularity than available at the server).
   Aggregation of data at the granularity of an IOT device, or an IOT device group may provide better visualization of an enterprise system infrastructure.
   Dashboards may be used to overlay incident creation or closure times through indicators. Dashboards may also correlate data vs incident creation, or highlight anomalies in the system.
IOT Application Layer
   When third party software developers, such as partners of a cloud service provider, develop an IOT Solution for a cloud service provider, the IOT Solution may contain parts that can be deployed to an IOT device and other parts that would go into the IOT Cloud.
   IOT device management may be assisted by a version/OTA updater tool that takes care of provisioning the latest IOT Application (e.g., most recently released version) for each of the registered IOT devices that require updates.
   Version checks may be used to ensure that the correct version of the IOT Application communicates with the server side counterpart of the IOT device Application. For example, some IOT devices may not have received an update yet and may need to continue to interface with a previous version on the server side until they are updated.
   IOT device application layer also may also contain other cloud service provider entities like Business Rules or Script Includes to assist in automation of flows through an Integration Hub application.
Having an understanding of the above brief overview of configuration and management of IOT devices using a client side SDK and server side integrations and provisioning techniques (e.g., virtual IOT devices), more detailed examples and embodiments are now explained, with reference to the drawings as necessary.
FIG. 1 illustrates a block diagram of an embodiment of network infrastructure 100 that includes a set of networks where embodiments of the present disclosure may operate. Network infrastructure 100 comprises a customer network 102, network 108, and a cloud service provider network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks (WI-FI is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 110).

As shown in FIG. 1, customer network 102 may be connected to one or more client devices 104A-E and allow the client devices 104A-E to communicate with each other and/or with cloud service provider network 110, via network 108 (e.g., Internet). Client devices 104A-E may be computing systems such as desktop computer 104B, tablet computer 104C, mobile phone 104D, laptop computer (shown as wireless) 104E, and/or other types of computing systems generically shown as client device 104A. Network infrastructure 100 may also include other types of devices generally referred to as Internet of Things (IOT) devices (e.g., edge IOT device 105) that may be configured to send and receive information via a network to access cloud computing services or interact with a remote web browser application (e.g., to receive configuration information). FIG. 1 also illustrates that customer network 102 includes local compute resources 106A-C that may include a server, access point, router, or other device configured to provide for local computational resources and/or facilitate communication amongst networks and devices. For example, local compute resources 106A-C may be one or more physical local hardware devices, such as a MID server, that facilitate communication of data between customer network 102 and other networks such as network 108 and cloud service provider network 110. Local compute resources 106A-C may also facilitate communication between other external applications, data sources (e.g., 107A and 107B), and services, and customer network 102. In network infrastructure 100, local compute resource 106A represents a MID server with singular access to data source 107A. That is, 107A is private data to MID server 106A in this example. Accordingly, any operation that requires access to data source 107A must execute on MID server 106A. Similarly, in this example, data source 106B is dedicated to MID server 106B. Local compute resource 106C illustrates a MID server cluster with three nodes. Of course, any number of nodes is possible, but three are shown in this example for illustrative purposes. In the context of the current disclosure, this example illustrates that those three nodes may be considered equivalent to each other as far as capabilities to perform operations designated for MID server 106C.

Network infrastructure 100 also includes cellular network 103 for use with mobile communication devices. Mobile cellular networks support mobile phones and many other types of mobile devices such as laptops etc. Mobile devices in Network infrastructure 100 are illustrated as mobile phone 104D, laptop computer 104E, and tablet computer 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resources 106A-C). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices (not shown) that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud service provider network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud service provider network 110 is illustrated as a remote network (e.g., a cloud network) that is able to communicate with client devices 104A-E via customer network 102 and network 108. The cloud service provider network 110 acts as a platform that provides additional computing resources to the client devices 104A-E and/or customer network 102. For example, by utilizing the cloud service provider network 110, users of client devices 104A-E may be able to build and execute applications, such as automated processes for various enterprise, IT, and/or other organization-related functions. In one embodiment, cloud service provider network 110 includes one or more data centers 112, where each data center 112 could correspond to a different geographic location. Within a particular data center 112, a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance (e.g., a unitary MySQL® catalog (MySQL® is a registered trademark owned by MySQL AB A COMPANY)).

To utilize computing resources within cloud service provider network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances (not shown in FIG. 1) are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer into a customer instance executing on that single server instance. In a multi-tenant environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114. Accordingly, different redundancy techniques may be used to alleviate this potential issue. Embodiments of this disclosure are not limited to any particular implementation of cloud resource. Instead, the disclosed embodiments may function in a similar manner and share operation workload (e.g., operations) for a task flow between compute resources on a customer private network (e.g., 102) and a corresponding customer instance provided in cloud service provider network 110.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud service provider network 110, and customer-driven upgrade schedules.

Figure 2:
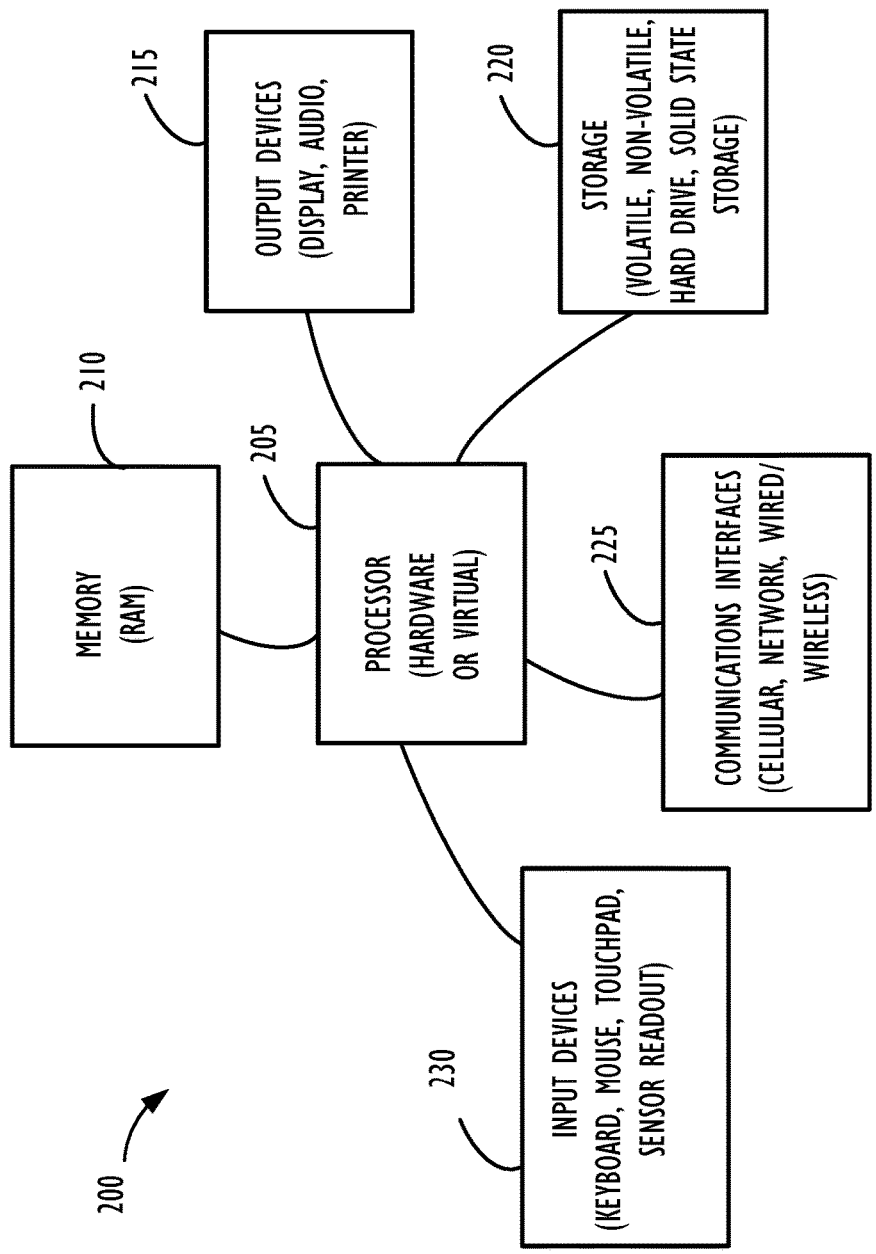
FIG. 2 illustrates a block diagram of a computing device 200 that may be used to implement operations described as being performed, for example, by a computer system or processing device according to one or more disclosed embodiments.

FIG. 2 illustrates a block diagram of a computing device 200 that may be used to implement one or more disclosed embodiments (e.g., network infrastructure 100, client devices 104A-104E, etc.). For example, computing device 200 illustrated in FIG. 2 could represent a client device or a physical server device and include either hardware or virtual processor(s) depending on the level of abstraction of the computing device. In some instances (without abstraction), computing device 200 and its elements, as shown in FIG. 2, each relate to physical hardware. Alternatively, in some instances one, more, or all of the elements could be implemented using emulators or virtual machines as levels of abstraction. In any case, no matter how many levels of abstraction away from the physical hardware, computing device 200 at its lowest level may be implemented on physical hardware. As also shown in FIG. 2, computing device 200 may include one or more input devices 230, such as a keyboard, mouse, touchpad, or sensor readout (e.g., biometric scanner) and one or more output devices 217, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 2, computing device 200 includes a processing element such as processor 205 that contains one or more hardware processors, where each hardware processor may have a single or multiple processor cores. In one embodiment, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 2, the processing elements that make up processor 205 may also include one or more other types of hardware processing components, such as graphics processing units (GPU), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 205. In one embodiment, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage device 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 200 may comprise other components well known in the art, such as sensors, powers sources, and/or analog-to-digital converters, not explicitly shown in FIG. 2.

Figure 3:
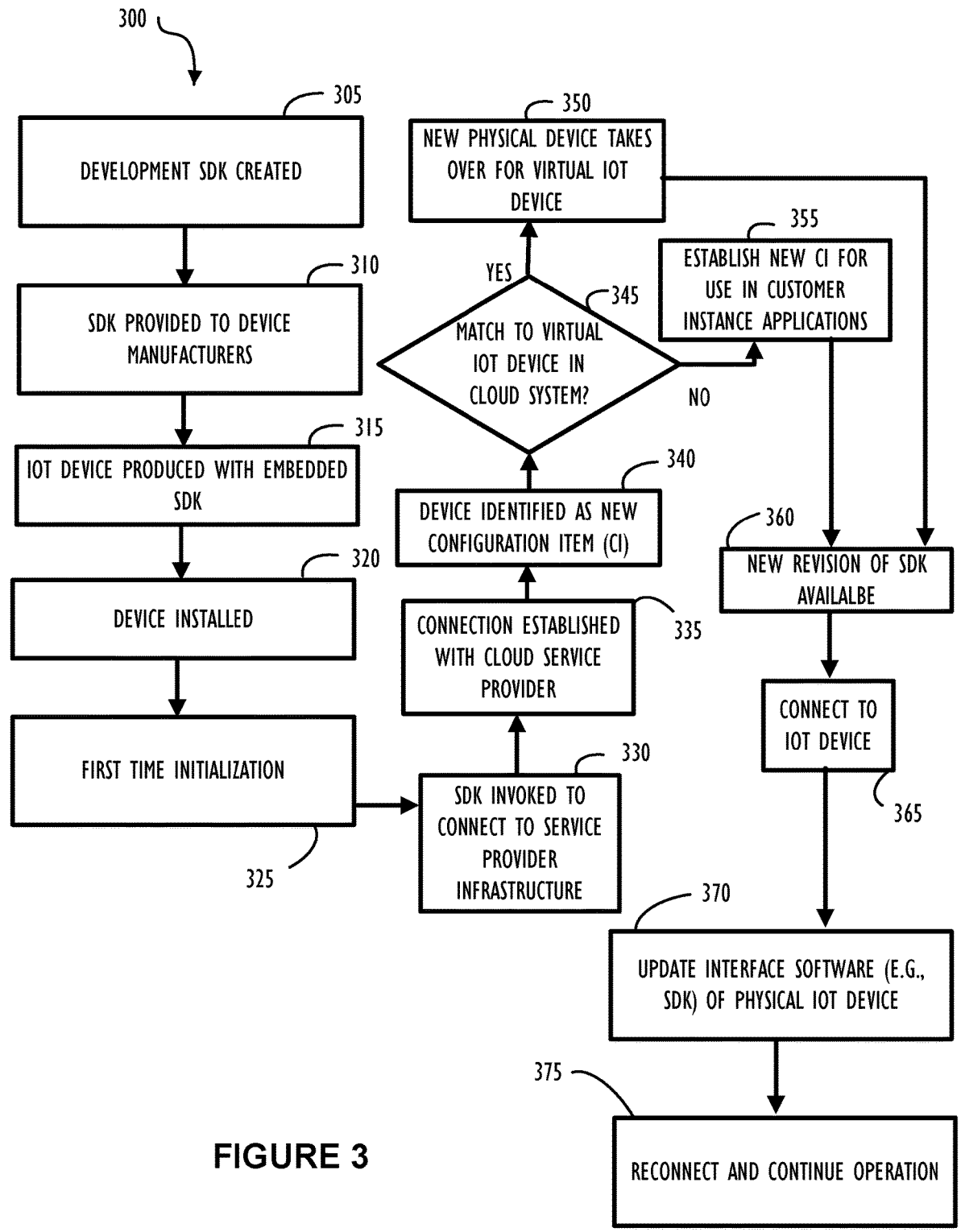
FIG. 3 is a flow chart for operation 300 illustrating one possible method for an SDK to be made available in an IOT device and interact with an enterprise computing environment, according to one or more disclosed embodiments.

Referring now to FIG. 3, a flow chart is illustrated to represent operation 300 for one possible method for an SDK to be made available in an IOT device and interact with an enterprise computing environment, according to one or more disclosed embodiments. Examples of enterprise computing environments and cloud service provider networks are discussed below with reference to FIGS. 5 and 6. Beginning at block 305 an SDK is created. For example, prepared by a cloud service provider with an eye toward connecting a device incorporating that SDK to a computer based infrastructure provided, in part, by the cloud service provider. Block 310 indicates that the SDK may be shared with one or more device manufacturers for incorporation into devices such that the IOT devices are produced with an embedded SDK (block 315). Block 320 indicates that the IOT device with the embedded SDK is installed for use. For example, in an enterprise environment of a corporation using cloud based management software from a cloud service provider. Block 325 reflects that the IOT device is initialized for the first time and the SDK may be invoked to connect to a service provider (e.g., cloud service provider) infrastructure. Block 330 indicates that at least a portion of the SDK may be invoked to connect to a service provider infrastructure. Block 335 indicates that a connection may be established with the service provider. Of course, it may take more than one attempt to make a successful connection and the SDK may be coded with proper retry logic to facilitate a successful connection. Block 340 indicates that after a successful connection the service provider may recognize the IOT device as a new configuration item (CI). CIs are commonly referenced in enterprise computing applications as components of the network infrastructure that may be managed with the help of a configuration management database (CMDB). Many software applications from different vendors are available to interact with enterprise CMDBs in various ways. Decision 345 determines if the newly discovered device matches a virtual IOT device (referenced above, and explained further below) already present in the cloud system (e.g., enterprise management system from a cloud based service provider). If the device is already defined, i.e., the YES prong of decision 345, flow continues to block 350 where the physical "real world device" (RWD) may take over for the virtual IOT device. Alternate methods of "take over" are described herein for different optional methods of providing interaction with an RWD with or without a corresponding Virtual IOT device representation. Flow continues to block 360 where a check may be performed to determine if the SDK that was embedded at manufacturing time requires update to a newer version. Alternatively, if the device is not already defined, i.e., the NO prong of decision 345, flow continues to block 355 where a new CI may be established for the IOT device and its incorporation into customer instance applications as provided by a cloud service provider. Again, a check may be made for an SDK update (block 360). Block 365 indicates that the service provider system may connect to the IOT device (presumably having the most current SDK) and perform standard operation with the IOT device properly represented as a CI within the CMDB of an enterprise. At a later time, flow may continue to block 370 where it may be determined that an update to the SDK system is available (either again or for the first time). In this case, because the IOT device has presumably been functioning for some time within the CMDB of the enterprise, extra care may need to be taken to ensure the device is properly quiesced (e.g., an orderly shutdown process) as part of its upgrade. Flow may then continue to block 375 where the IOT may reconnect and continue operation.

Figure 4:
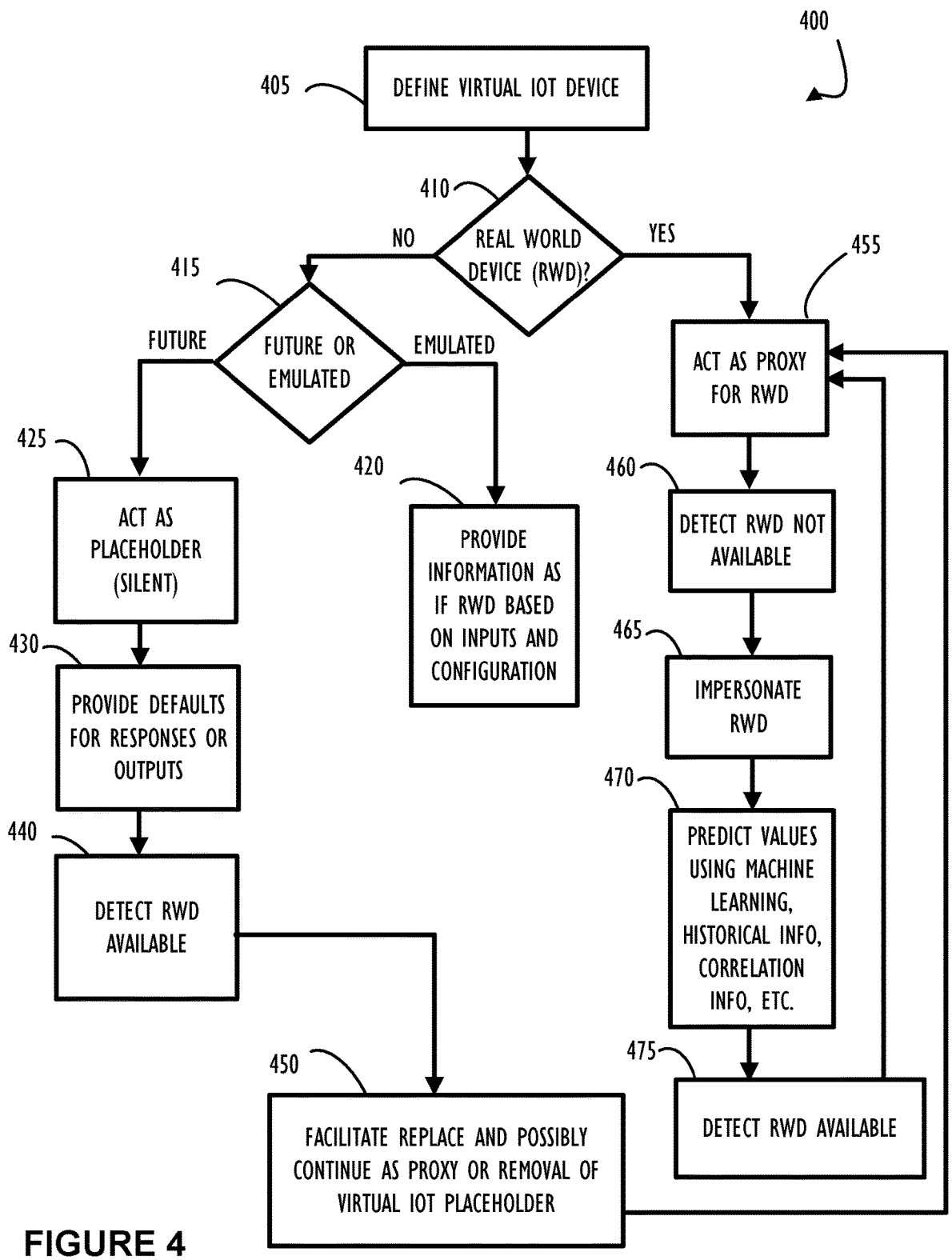
FIG. 4 is a flow chart for operation 400 illustrating one possible method for virtual IOT devices to be used within an enterprise computing environment, according to one or more disclosed embodiments.

FIG. 4 is a flow chart for operation 400 illustrating one possible method for virtual IOT devices to be used within an enterprise computing environment, according to one or more disclosed embodiments. Beginning at block 405, a virtual IOT device may be defined. As part of that definition, decision 410 determines if the virtual IOT device represents a RWD. If not, i.e., the NO prong of decision 410, flow continues to decision 415 where it may be determined if the virtual IOT device is a place holder for a future device or represents an emulated device that may never exist in the real world. If the device is emulated, i.e., the EMULATED prong of decision 415, flow continues to block 420 where the emulated device may continue to provide information as if it were a RWD based on programmed inputs and configuration. Alternatively, if the device represents a future IOT device, i.e., the FUTURE prong of decision 415, flow continues to block 425 where the virtual IOT device may act as a place holder (e.g., silent place holder) for a device that is not yet installed in the enterprise. Alternatively, the virtual device place holder may not be silent and, as indicated by block 430, provide default responses or outputs for future sensors. These future devices may be useful, for example, to test application interaction for devices prior to them being actually installed, to perform stress testing, or other things. Block 440 indicates that a RWD device may be detected as now available for this "future" device. Upon detection, flow may continue to block 450 where operation 400 may alter the future designation for this virtual IOT device and either delete the virtual IOT device because it is no longer needed, or alter it to become a proxy type device (block 455) for the RWD. The NO prong of block 410 and the exit path of block 450 each indicate that a RWD is available and flow continues to block 455 where a proxy type virtual IOT device is established.

As explained briefly above, the proxy type virtual IOT device may respond for the RWD during periods when the RWD is not able to respond. Block 460 indicates that a detection of the RWD being not available is made. Block 465 indicates that the virtual IOT device may then impersonate the RWD. Impersonation may include a number of different possible implementations as shown at block 470. For example, impersonation may simply return a most recent value to any query for data, may return historical or correlated information based on time of day or other available information, or may use machine learning techniques to identify a "most likely" response for the RWD that is not able to respond for itself. In this example, time of day responses may reflect that at noon yesterday (and for the last 10 days) a sensor reading was X, therefore, if a query comes to the virtual IOT device at noon for the value of that sensor it may simply return X. In this example, correlation may reflect that a value of Y is always returned for sensor A when sensor B is set to "ON," therefore, if a query comes in for sensor A when the virtual IOT device believes that sensor B is "ON" the virtual IOT device may simply return Y. Block 475 indicates that the RWD device is available again and flow returns to block 455 where the virtual IOT device again assumes a proxy role for the RWD. Note, that when in proxy mode, the virtual IOT device may simply be a pass through such that it passes values and requests back and forth with the RWD without altering those commands or responses. However, even in pass through mode the virtual IOT device may store attributes of the interaction for later use when it is asked to provide information for an unavailable RWD.

Figure 5:
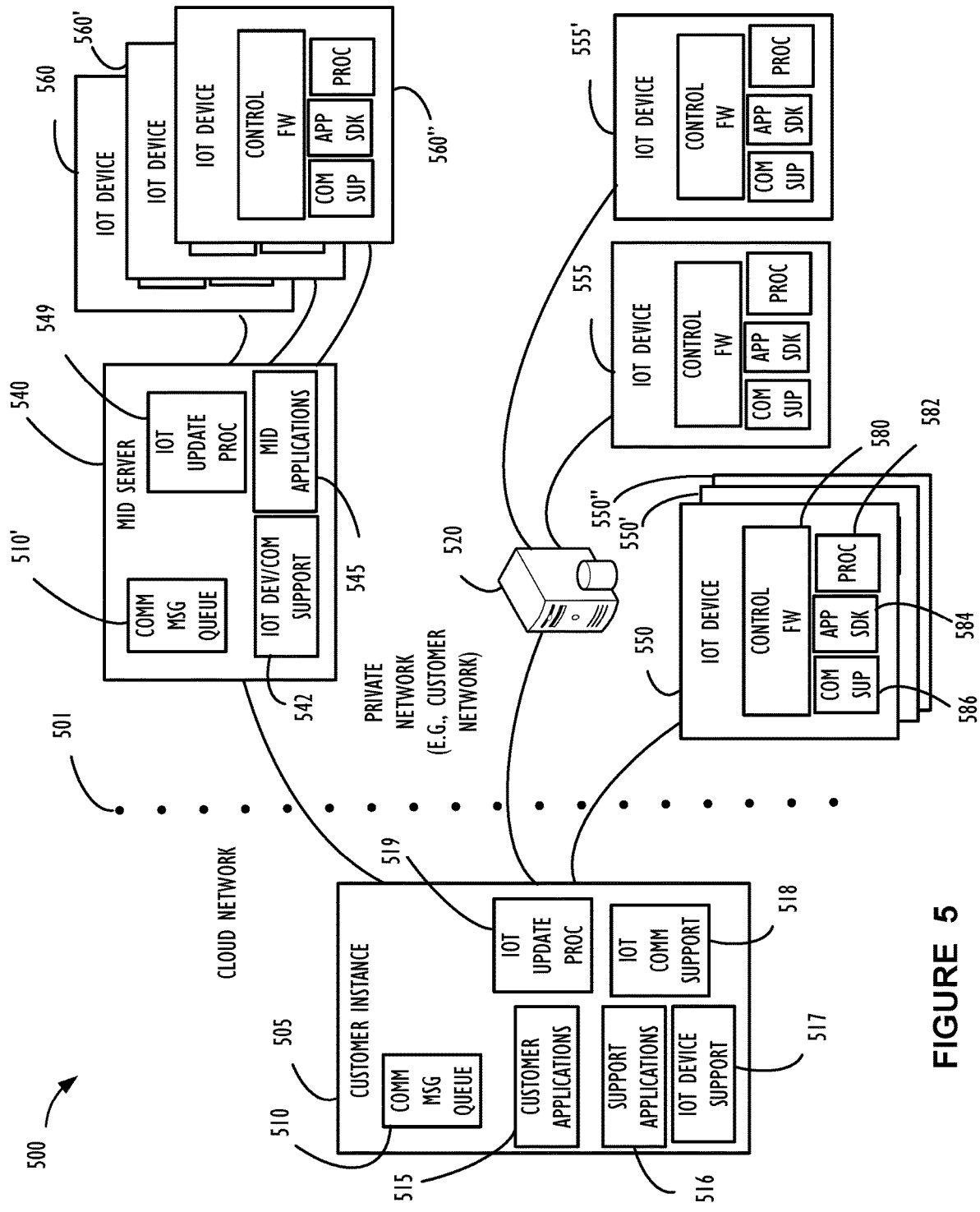
FIG. 5 is block diagram of a hybrid infrastructure 500 including a cloud-based customer instance in communication with a management, instrumentation, and discovery (MID) server, located within a private network (e.g., customer network), and a plurality of IOT devices on the customer network or accessible via another network, according to one or more disclosed embodiments.

FIG. 5 is block diagram of a hybrid infrastructure 500, according to one or more disclosed embodiments, including a cloud-based customer instance 505 located in a cloud network, as indicated on the left hand side of dotted line 501. Customer instance 505 is in communication with a management, instrumentation, and discovery (MID) server 540, located within a private network (e.g., customer network) as indicated on the right side of line 501, and a plurality of IOT devices (e.g., 550, 555, 560) on the customer network or accessible via another network (e.g., Internet). Included in customer instance 505, communication message queue 510 may be used to talk to other servers' message queues (e.g., 510' of MID server 540).

Also included in customer instance 505, customer applications 515, and support applications 516 are shown. These collectively reflect any number of applications that may be provided as part of a service provider infrastructure for which to integrate IOT devices according to the disclosed examples. For example, customer applications 515 and support applications 516 may be configured to provide help desk or service level management for an enterprise and may interact to provide these capabilities using the aforementioned CMDB (not shown). Finally, customer instance 505 includes IOT device support 517, IOT communication support 518, and IOT update procedures 519. Each of these capabilities may be used to facilitate their corresponding actions with IOT devices throughout the enterprise.

Hybrid infrastructure 500 also includes MID server 540, conventional server 520, and directly addressable IOT devices 550. MID server 540, in this example, is configured to include an IOT DEV/COM support module 542 and IOT update process module 549, each of which may facilitate interaction between customer instance 505 and IOT devices 560 that connect to the network via MID server 540. MID server 540 also includes MID applications 545 that may provide application support to applications running in customer instance 505. MID applications 545 may aggregate or correlate information from IOT devices 560 prior to (or rather than) providing all available data to customer instance 505. As shown in this example, MID server 540 represents a communication path for customer instance 505 to communicate with IOT devices 560, 560', and 560".

Conventional server 520, in the example hybrid infrastructure 500, provides communication between customer instance 505 and IOT devices 555 and 555'. Conventional server 520 may simply be a router or switch that provides network connectivity. Alternatively, conventional server 520 may perform similar capabilities to those described above with respect to MID server 540. The final set of IOT devices shown in hybrid infrastructure 500 are "directly addressable" IOT devices 550, 550', and 550". In this example, directly addressable means that there may or may not be an intermediary server configured to add information to communications between customer instance 505 and these directly addressable IOT devices. Of course, there may be any number of routers, switches, or servers in the communication path, but they do not provide augmentation to the communication between customer instance 505 and the IOT device. As further illustrated in FIG. 6, these directly-addressable devices may be connected to customer instance 505 either through a customer network (e.g., private network as shown in FIG. 5) or bypass the private network altogether and connect directly via a public network such as the Internet (as shown in FIG. 6 for IOT device 620).

Each IOT device shown in hybrid infrastructure 500 includes an example of one disclosed embodiment of an SDK that may have initially been embedded in the device at time of manufacture. For clarity, not all IOT devices in FIG. 5 have element reference numbers, but they are shown for IOT device 550. For example, IOT device 550 includes control firmware 580, communication support 586, application SDK 584, and processing capability 582. These modules may be configured to allow IOT device 550 (and other IOT devices) to perform the methods and implementation examples discussed throughout this disclosure.

Figure 6:
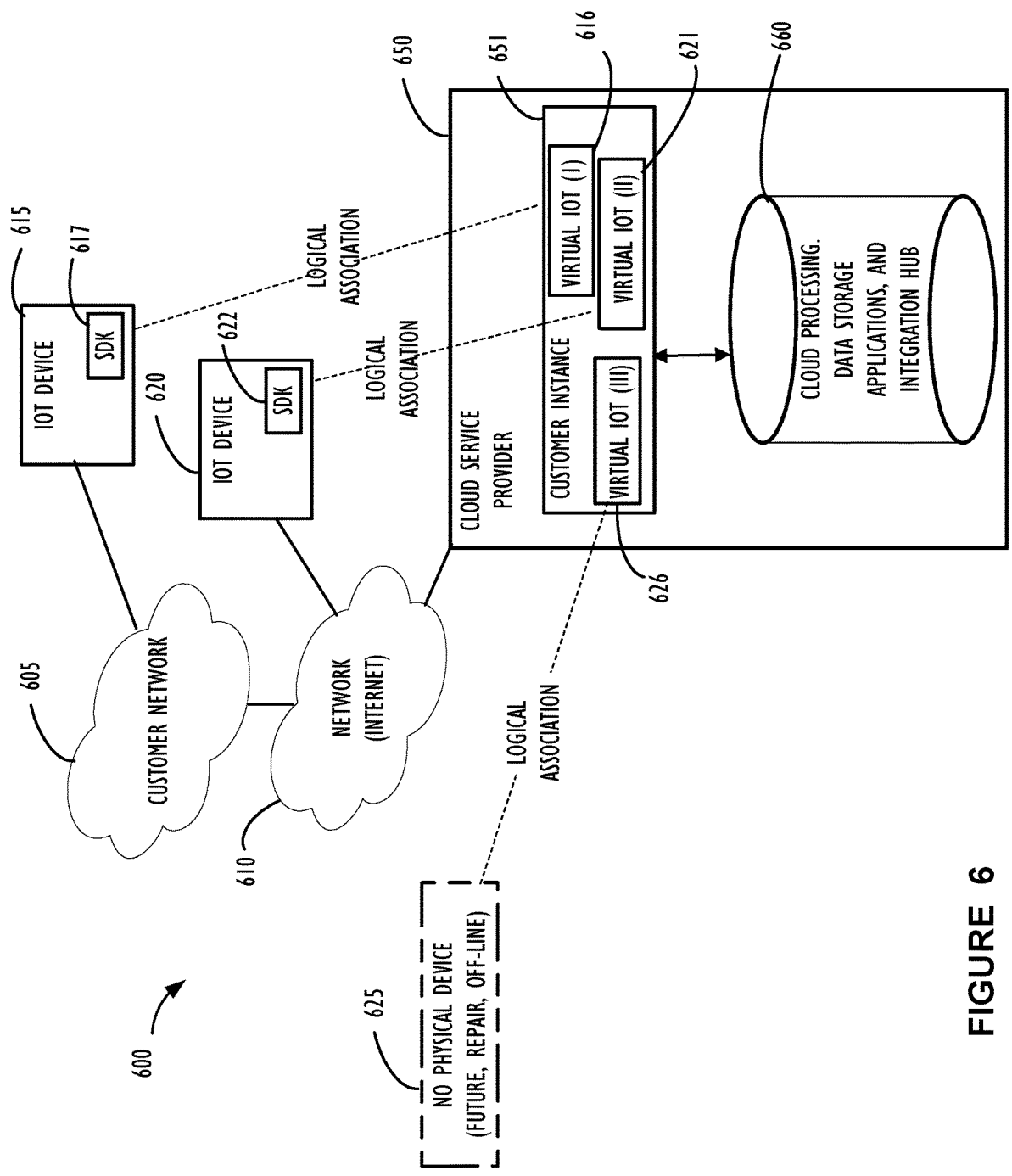
FIG. 6 is block diagram of an enterprise infrastructure 600 including a cloud-based customer instance in communication with multiple physical IOT devices and supporting virtual IOT devices in different modes, according to one or more disclosed embodiments.

Referring now to FIG. 6, a block diagram of an enterprise infrastructure 600 is illustrated, according to one or more disclosed embodiments. Enterprise infrastructure 600 includes a cloud-based customer instance 651 hosted by a cloud service provider 650. Cloud service provider 650 typically hosts multiple customer instances, but only a single customer instance 651 is shown in this example. Cloud service provide 650 may also provide a set of cloud based applications 660 that include cloud processing, data storage, support applications (e.g., service level management or help desk), and applications like a task flow scheduler referred to here as Integration Hub. Customer instance 651 is shown to be in communication with multiple physical IOT devices 615 and 620, along with supporting virtual IOT devices 616, 621, and 626 that may operate in different modes. Also shown in enterprise infrastructure 600 is a logical representation 625 of a non-existent physical device that may represent a future device, a device out for repair, or a device temporarily off-line that has a corresponding logical representation within customer instance 651 as Virtual IOT (III) 626. As illustrated, Virtual IOT (1) 616 exists in customer instance 651 and has a logical association with IOT device 615. Virtual IOT (II) 621 is also in customer instance 651 and has a logical association with IOT device 620. Note that IOT device 615 is connected to customer instance 651 through a public network (e.g., Internet Network 610) to customer network 605 (e.g., a private network). Also note that IOT device 620 does not exist in a customer private network and is directly connected to public network (e.g., Internet Network 610). Each IOT device 615 and 620 include an SDK (i.e., SDK 617 and SDK 622 respectively). Overall, FIG. 6 represents a diagram of the logical associations of elements discussed throughout this disclosure, though other implementations are certainly possible.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. An apparatus configured as an interne of things (IOT) endpoint device, comprising:
a processor;
a memory storing computer instructions including a software development kit (SDK), the SDK provided, at least in part, by an enterprise system service provider; and
a network interface communicatively coupled to the processor and the memory, wherein the processor executes the instructions to cause the apparatus to:
establish an automatic connection to a cloud-based management server customer instance, the automatic connection established using the network interface and a first connection to a private network, a second connection from the private network to a public network, and a third connection from the public network to the cloud-based management server customer instance;
transmit information regarding control and command capability of the IOT endpoint device using a communication mechanism facilitated by the SDK to the cloud-based management server customer instance, the transmitted information comprising a set of actions applicable to the IOT endpoint device, wherein at least one action from the set of actions is previously not known at the cloud-based management server customer instance;
receive and respond to requests for information from the cloud-based management server customer instance to provide information sufficient to integrate the apparatus into a workflow defined on the customer instance and supported by the cloud-based management server maintained by the enterprise system service provider; and
receive a command request initiated by the cloud-based management server customer instance to initiate at least one of the set of actions.

2. The apparatus of claim 1, wherein the set of actions includes an action to control a physical component of the apparatus.

3. The apparatus of claim 1, wherein the computer instructions further include instructions to cause the processor to receive an update to at least a portion of the SDK.

4. The apparatus of claim 3, wherein the computer instructions further include instructions to cause the processor to perform an orderly shutdown as part of receiving the update.

5. The apparatus of claim 1, wherein the computer instructions further include instructions to cause the processor to receive an authentication token uniquely identifying the IOT endpoint device and using the authentication token for future automatic connections to the cloud-based management server customer instance.

6. The apparatus of claim 1, wherein the IOT endpoint device includes a fan and fan control logic, a valve and valve control logic, a temperature sensor and temperature control logic, or a positioning measurement device.

7. The apparatus of claim 1, wherein the workflow defined on the customer instance comprises a help desk application, an incident reporting application, or a service level agreement application.

8. The apparatus of claim 7, wherein the set of actions includes one or more actions to integrate the IOT endpoint device into the workflow as a configuration item element representing a component affected by the workflow.

9. An internet of things (IOT) endpoint device, comprising:
a processor; and
a memory, accessible by the processor, the memory storing instructions provided, at least in part, by an enterprise system service provider, wherein the instructions, when executed by the processor, cause the processor to perform operations comprising:
establishing an automatic connection to a cloud-based management server customer instance;
transmitting, to the cloud-based management server customer instance, information regarding control and command capability of the IOT endpoint device, the transmitted information comprising a set of actions applicable to the IOT endpoint device, wherein at least one action of the set of actions was previously not known by the cloud-based management server customer instance;

receiving, from the cloud-based management server customer instance, a request for information to integrate the IOT endpoint device into a workflow defined on the customer instance and supported by the cloud-based management server maintained by the enterprise system service provider;

transmitting, to the cloud-based management server customer instance, the information to integrate the IOT endpoint device into the workflow; and receiving a command request initiated by the cloud-based management server customer instance to initiate an action of the set of actions.

10. The IOT endpoint device of claim 9, the operations comprising: receiving, from the cloud-based management server customer instance, an update to at least a portion of the instructions.

11. The IOT endpoint device of claim 10, the operations comprising postponing the update based on an operational state of a physical component of the IOT endpoint device.

12. The IOT endpoint device of claim 10, the operations comprising performing a shutdown of a physical component of the IOT endpoint device.

13. The IOT endpoint device of claim 9, the operations comprising transmitting, to the cloud-based management server customer instance, location data associated with the IOT endpoint device.

14. The IOT endpoint device of claim 9, wherein the command request is received via a virtual IOT device.

15. The IOT endpoint device of claim 14, the operations comprising transmitting information to the cloud-based management server customer instance via the virtual IOT device.

16. The IOT endpoint device of claim 14, the operations comprising receiving a second command request to initiate a second action of the set of actions from a queue via the virtual IOT device.

17. A method, comprising:

establishing, via an internet of things (IOT) endpoint device, an automatic connection to a cloud-based management server customer instance;

transmitting, to the cloud-based management server customer instance, via a communication mechanism to the cloud-based management server customer instance, information regarding control and command capability of an internet of things (IOT) endpoint device, the transmitted information comprising a set of actions applicable to the IOT endpoint device, wherein at least one action of the set of actions was previously not known by the cloud-based management server customer instance;

receiving, from the cloud-based management server customer instance, a request for information to integrate the IOT endpoint device into a workflow defined on the customer instance and supported by the cloud-based management server maintained by an enterprise system service provider;

transmitting, to the cloud-based management server customer instance, the information to integrate the IOT endpoint device into the workflow; and receiving a command request initiated by the cloud-based management server customer instance to initiate an action of the set of actions.

18. The method of claim 17, comprising:

receiving, from the cloud-based management server customer instance, an update to instructions stored in memory of the IOT endpoint device;

performing, in response to receiving the update, a shutdown of a physical component of the IOT endpoint device; and re-establishing the automatic connection to the cloud-based management server customer instance.

19. The method of claim 18, comprising receiving, in response to re-establishing the automatic connection, a second command request to initiate a second action of the set of actions from a queue via a virtual IOT device.

20. The method of claim 18, comprising receiving, in response to establishing the automatic connection, an authentication token uniquely identifying the IOT endpoint device.

* * * * *